June 7, 1927.
F. GFELLER
WATER SHUT-OFF VALVE
Filed March 10, 1925
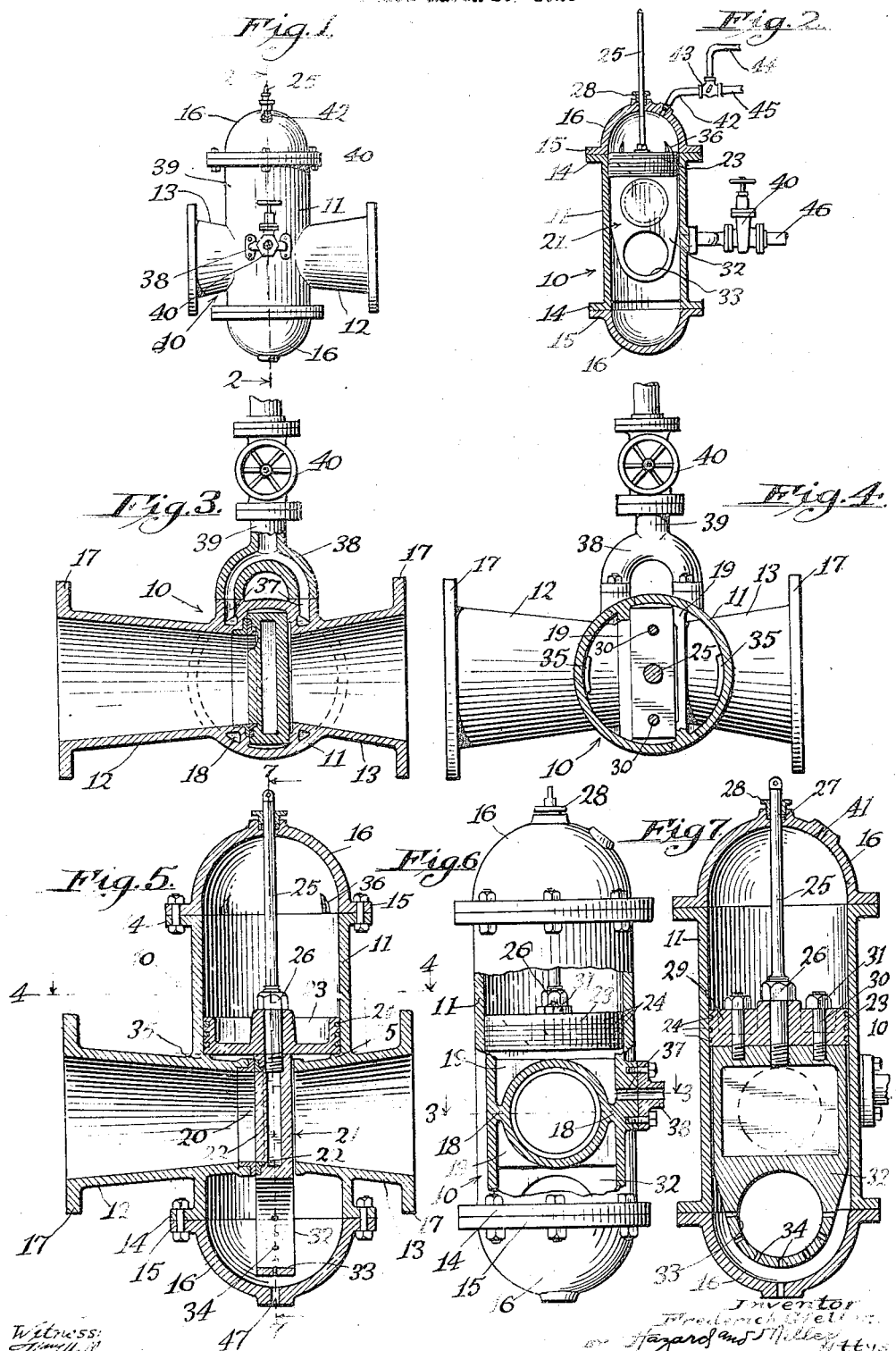

Patented June 7, 1927.

1,631,481

UNITED STATES PATENT OFFICE.

FREDERICK GFELLER, OF ALHAMBRA, CALIFORNIA.

WATER-SHUT-OFF VALVE.

Application filed March 10, 1925. Serial No. 14,465.

This invention relates to improvements in valves, which are especially adapted to be used in connection with hydro-electric power plants and the like, but may be used under other circumstances as well.

An object of the invention is to provide an improved valve consisting essentially of a body providing a cylinder or shell into which extend two opposed conduits. A disc-like closure is adapted to be inserted between the ends of the conduits to prevent the passage of fluid therethrough and this disc-like closure is actuated by a hydraulically operated piston which is reciprocable in the shell formed in the body. By arranging the construction of the valve in such a manner that the piston is reciprocable in the valve body instead of a separate cylinder, the size of the valve is greatly decreased, and other advantages will be made manifest in the following detailed description.

A further object of the invention is to provide a device for controlling the passage of fluid flow through a conduit, and to associate with that device means for determining the quantity of fluid passing through the conduit when the fluid is allowed to pass therethrough. In other words, it is an object of the invention to provide a valve and means for determining the amount of fluid passing through the valve when the valve is open.

With the foregoing and other objects in view which will be made manifest in the following detailed description and pointed out in the appended claims, reference is had to the accompanying drawings for an illustrative embodiment of the invention, wherein:

Figure 1 is a side elevation of the improved valve;

Fig. 2 is a vertical section taken substantially on the line 2—2 of Fig. 1;

Fig. 3 is a horizontal section through the valve and is taken approximately on the line 3—3 of Fig. 6;

Fig. 4 is a plan view of the valve, parts shown in section being taken on the line 4—4 of Fig. 5;

Fig. 5 is a longitudinal vertical section through the valve;

Fig. 6 is an end elevation of the valve, parts being broken away and shown in section, approximately on the line 6—6 of Fig. 5; and Fig. 7 is a vertical section through the valve taken upon the line 7—7 of Fig. 5.

Referring to the accompanying drawings wherein similar reference characters designate similar parts throughout, the improved valve consists of a body generally designated at 10. This body provides a cylinder or shell 11 and a pair of conduits 12 and 13 extending into the shell from opposite sides thereof with their ends which are adjacent each other disposed in spaced relation. Although the shell 11 and the conduits 12 and 13 may be made of separate parts and secured together, the shell or cylinder 11 and the conduits 12 and 13 are preferably formed from a single casting, making these parts integral with each other. Adjacent the top and bottom of the shell or cylinder 11 there are formed flanges 14 to which may be secured flanges 15 of end closures or bonnets 16. The conduits 12 and 13 are provided with interior surfaces which are convergent toward the center of the shell 11 for a purpose hereinafter to be described.

The conduit 13 which is shown as being somewhat shorter than the conduit 12 constitutes an inlet conduit to the valve and the conduit 12 constitutes an outlet from the valve. The conduits 12 and 13 adjacent their outer ends are provided with flanges 17 or other suitable means for connecting these parts to adjacent ends of pipe sections in a pipe line or the like. Upon the sides of the conduits 12 and 13 there are formed ribs 18 which connect the conduits 12 and 13 within the shell 11 to the sides of the shell, and also form a partition in conjunction with the conduits 12 and 13 between the top and bottom of the shell 11. The inner ends of the conduits 12 and 13, which are disposed in spaced relation to each other, are provided with flanges 19 which connect the ends of the conduits to the interior of the shell. As shown in Fig. 6, these flanges are approximately rectangular in form. The outlet conduit 12 has its inner end provided with a seat 20 which is circular in form and is angular in cross section. This seat is preferably formed of brass, bronze or other suitable metal which will provide a good seating surface and which will not easily become corroded.

A closure member, generally designated at 21, is adapted to be inserted between the adjacent ends of the conduits 12 and 13 to prevent the passage of fluid therethrough. This closure member is approximately rectangular in form and may be hollow, as shown in Fig. 5. A face 22, which may be formed of brass, bronze or other suitable material, is adapted to be mounted upon the closure member so as to bear against the seat 20. The flanges 19 upon the inner ends of the conduits 12 and 13 provide a guide for the closure when it is inserted or withdrawn from between the adjacent ends of the conduits.

The cylindrical shell 11 is of a sufficient height above the conduits 12 and 13 to provide a cylinder in which is reciprocable a piston 23 which may be provided with piston rings 24 or other suitable packing, as desired. A stem 25 extends through the piston 23 and has its lower end threaded into the closure member 21. A nut 26 is also threaded upon the stem 25 to rigidly secure the piston 23 to the closure. The stem 25 extends upwardly through the upper end closure 16 of the shell 11 and packing 27 may be compressed thereabove as by packing gland 28. A diametrical rib 29 may be formed upon the piston 23 and studs 30 extend downwardly through the rib 29 and are threaded into the closure 21. Nuts 31 may be threaded upon the studs 30 and in this manner the studs 30 cooperate with the stem 25 in securing the piston upon the top of the closure. A member 32 is formed integral with the closure 21 and has a bore 33 extending longitudinally therethrough. This bore has an internal diameter substantially equal to the internal diameter of the conduits 12 and 13 adjacent their inner ends. When the closure 21 is positioned between the conduits 12 and 13, the member 32 is disposed within the lower end of the shell 11. When the closure 21 is withdrawn from between the conduits so as to open the valve, the member 32 occupies the space between the ends of the conduits so as to form a comparatively smooth and continuous passage through the valve. The member 32 is provided with a plurality of peripheral apertures 34 for a purpose hereinafter to be described. The piston 23 has its downward movement limited by shoulders 35 formed upon the interior of the shell or cylinder 11, and the upward movement of the piston 23 may be limited by bosses or lugs 36 formed upon the interior of the upper bonnet 16. The interior surfaces of the shell 11, the ribs 18 and the flanges 19 define chambers which communicate with the cylinder provided in the upper end of the shell 11, and upon one side of the valve there are formed two bores 37 which extend through the shell to a point slightly above the ribs 18. A branched conduit 38 is connected with the two bores 37 and this conduit is in turn connected to a pipe section 39 to a valve 40. In the upper bonnet or end closure 16 there is formed an aperture 41 which is connected by means of a pipe 42 to a 3-way valve 43. A pipe 44 leads from the penstock or the pressure side of the valve to the 3-way valve 43, and a pipe 45 constitutes a discharge pipe from the 3-way valve 43. A pipe 46 constitutes a discharge from the valve 40.

The operation of the valve is as follows: Normally the 3-way valve 43 and the valve 40 are closed with the closure 21 disposed between the conduits 12 and 13 and the piston 23 at the bottom of its cylinder. By turning the valve 43 so as to cut off the pressure from the pipe 44 and releasing the pressure within the shell 11 through the pipe 45, the piston 23 will be caused to rise within its cylinder, lifting the closure 21. This is produced by leakage of fluid between the closure 21 and the inner end of the conduit 13. The fluid within the conduit 13 leaks through the clearance between the closure 21 and the flanges 19 of the conduit 13 and escapes into the shell 11 below the piston 23. As the closure 21 is rectangular in section, as clearly shown in Fig. 3, providing a slight clearance between the shell 11 and the closure, the fluid, which escapes into the shell 11 below that portion of the piston 23 which is disposed above the conduit 13, can escape around the closure within the shell so as to exert pressure upon the under side of the piston 23 which is disposed above the inner end of the conduit 12. The pressure exerted by the leakage is sufficient to elevate the piston and the closure and will cause under ordinary circumstances a slow smooth opening of the valve. Where the improved valve is inserted in a pipe line conducting a fluid under a very high pressure, a throttling of the 3-way valve 43 may be necessary to prevent the opening of the valve from becoming too rapid. In closing the valve, the valve 40 is opened so as to allow the fluid within the shell 11 beneath both sides of the piston 23 to escape through the pipe 46. Preferably, the branched conduit 38 and the pipe 46 are of a considerable diameter so that the fluid beneath the piston can quickly escape and any leakage occurring during the closing of the valve can also escape from beneath the piston. At the same time the valve 43 is turned so as to admit pressure through the pipe 44 to the shell 11 above the piston 23, forcing the piston into closed position. It will thus be readily appreciated that the improved valve employs the leakage between the conduits and the closure for opening it, and that this leakage, being relatively small, will produce a smooth opening of the valve. This smooth opening of the valve is highly desirable in valves controlling the flow of water through a penstock, for which purpose the improved valve is primarily designed, although it may be used for other purposes as well.

The advantage of mounting the piston 23 within the body of the valve is that such construction permits the piston to be connected directly to the top of the closure. Heretofore when valves have been constructed, the cylinder, within which the piston is reciprocable, is usually some distance above the body of the valve, and a rod connects the piston to the closure. Because of the high pressures bearing against the face of the closure, a considerable force is required to move the closure, and when the rod connecting the piston to the closure is of a considerable length, it will tend to stretch and in this manner causes jumping of the closure as it is withdrawn from between the ends of the conduits, tending to produce water hammer and other undesirable results. Mounting the piston 23 upon the top of the closure eliminates this disadvantage.

As previously pointed out, the interior surfaces of the conduits 12 and 13 are tapered toward each other and the member 32 is provided with peripheral apertures 34. The tapered conduits 12 and 13 provide a construction very similar to the conventional type of Venturi meter. An aperture 47 is formed in the bottom end closure 16 and a piezometer may be connected to the aperture 47. Another piezometer may be connected to the pipe line leading to the inlet conduit 13. In this manner the Venturi meter arrangement is provided upon the valve for determining the amount of fluid flow through the valve. The bore 33 in the member 32 being formed in the closure can be accurately machined so as to accurately determine the interior diameter and consequently the area of the orifice through which the fluid flows. The piezometers determine the pressure of the fluid at the point where it passes through the constricted orifice and also at a point where the interior diameter of the conduit is somewhat larger than the interior diameter of the bore 33. The fluid pressure within the bore 33 is transmitted through the apertures 34 and through the aperture 47 to the piezometer, and in this manner an accurate Venturi meter is associated with the valve.

From the above it is believed to be readily apparent that an improved valve is constructed which is adapted to handle fluids under high pressures and which will overcome certain disadvantages experienced in valves of prior construction. Furthermore, a valve is provided, which has associated with it means for determining the amount of fluid flow through the valve when the valve is open.

It will be understood that various changes in the detail of construction may be made without departing from the spirit or scope of the invention as defined by the appended claims.

I claim:

1. A valve comprising a cylindrical body, closures for the top and bottom of said body, a pair of aligned conduits extending into said body having their adjacent ends disposed in spaced relation therein, webs connecting the sides of the conduits to the sides of the body and cooperating with the conduits in defining an upper piston cylinder and a lower chamber in said body, a closure adapted to be disposed between the adjacent ends of said conduits for preventing the passage of fluid therethrough, a piston reciprocable in said piston cylinder and secured directly to the closure, and means for admitting fluid pressure to the piston cylinder upon either side of the piston so as to move the piston and closure.

2. A valve comprising a cylindrical body, closures for the top and bottom of said body, a pair of aligned conduits extending into said body having their adjacent ends disposed in spaced relation therein, webs connecting the sides of the conduits to the sides of the body and cooperating with the conduits in defining an upper piston cylinder and a lower chamber in said body, a closure adapted to be disposed between the adjacent ends of said conduits for preventing the passage of fluid therethrough, a piston reciprocable in said piston cylinder and secured directly to the closure, means for admitting fluid pressure to the piston cylinder upon either side of the piston so as to move the piston and closure, and a stem secured to the piston and slidably extending through the top of said piston cylinder.

3. A valve comprising a cylindrical body, closures for the top and bottom of said body, a pair of aligned conduits extending into said body having their adjacent ends disposed in spaced relation therein, webs connecting the sides of the conduits to the sides of the body and cooperating with the conduits in defining an upper piston cylinder and a lower chamber in said body, a closure adapted to be disposed between the adjacent ends of said conduits for preventing the passage of fluid therethrough, a piston reciprocable in said piston cylinder and secured directly to the closure, means for admitting fluid pressure to the piston cylinder upon either side of the piston so as to move the piston and closure, and a member having a passage therethrough secured to said closure adapted to assume a position between the adjacent ends of said conduits when the closure is removed therefrom.

4. A valve comprising a cylindrical body, a top and a bottom closure for the body, two aligned conduits extending into the body having their adjacent ends disposed in spaced relation therein, said conduits having their interior surfaces converging toward their adjacent ends, webs connecting the sides of said conduits to the sides of said body defining an upper piston cylinder and a lower chamber in said body, a closure adapted to be disposed between the adjacent ends of said conduits, a piston reciprocable in said piston cylinder and connected to said closure, a member having a passage therethrough secured to the closure and disposed in said lower chamber adapted to assume a position between the ends of said conduits when the closure is removed therefrom, and means for admitting fluid pressure to said piston cylinder upon either side of the piston to produce movement of said piston, closure and member, said member having peripheral apertures formed therein, there being an aperture formed in the body communicating with said lower chamber to which a pressure indicating device may be connected as and for the purpose described.

5. A valve for pen-stock and the like, comprising a shell, two aligned conduits extending into the shell and having their adjacent ends in spaced relation therein, said shell providing a piston cylinder, one end of which is defined by the conduits, a piston reciprocable in the piston cylinder, a disk like closure adapted to assume a position between the conduits, said closure being fastened directly against the under side of the piston and means for admitting fluid to the piston cylinder upon either side of the piston to open or close the valve.

6. A valve for penstocks and the like comprising a body, an inlet and an outlet conduit extending into said body, said conduits being aligned and having their adjacent ends spaced from each other, a disc-like closure adapted to assume a position between the conduits to close them, said body providing a piston cylinder, a piston reciprocable therein to which the closure is connected, there being a sufficient clearance between the closure and the inlet conduit to enable fluid to pass from the inlet conduit to the piston cylinder to cause the piston to move the closure into open position and means for moving the piston in the opposite direction to move the closure into closed position.

In testimony whereof I have signed my name to this specification.

FREDERICK GFELLER.